(12) United States Patent
Mistry

(10) Patent No.: US 10,721,719 B2
(45) Date of Patent: Jul. 21, 2020

(54) OPTIMIZING CACHING OF DATA IN A NETWORK OF NODES USING A DATA MAPPING TABLE BY STORING DATA REQUESTED AT A CACHE LOCATION INTERNAL TO A SERVER NODE AND UPDATING THE MAPPING TABLE AT A SHARED CACHE EXTERNAL TO THE SERVER NODE

(71) Applicant: Citrix Systems, Inc., Fort Lauderdale, FL (US)

(72) Inventor: Shaunak Mistry, Scotts Valley, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 411 days.

(21) Appl. No.: 15/627,950

(22) Filed: Jun. 20, 2017

(65) Prior Publication Data
US 2018/0368123 A1  Dec. 20, 2018

(51) Int. Cl.
*H04W 72/04* (2009.01)
*G06F 12/0817* (2016.01)
*H04L 29/08* (2006.01)
*G06F 12/0806* (2016.01)

(52) U.S. Cl.
CPC .... *H04W 72/0406* (2013.01); *G06F 12/0806* (2013.01); *G06F 12/0824* (2013.01); *H04L 67/2819* (2013.01); *H04L 67/2876* (2013.01)

(58) Field of Classification Search
CPC .......... H04W 72/0406; H04L 67/2876; H04L 67/2819; G06F 12/0824; G06F 12/0806
See application file for complete search history.

(56) References Cited

U.S. PATENT DOCUMENTS

| 5,802,578 | A | * | 9/1998 | Lovett | G06F 12/0824 711/141 |
| 6,249,801 | B1 | * | 6/2001 | Zisapel | G06F 9/505 718/105 |
| 6,427,187 | B2 | * | 7/2002 | Malcolm | H04L 67/2842 707/999.01 |
| 6,430,618 | B1 | * | 8/2002 | Karger | G06F 9/5027 709/225 |
| 6,438,652 | B1 | * | 8/2002 | Jordan | G06F 9/505 709/219 |

(Continued)

OTHER PUBLICATIONS

"Load Balancer;" Glossery and Terms; Accessed May 30, 2017; https://f5.com/glossary/load-balancer.

(Continued)

*Primary Examiner* — Daniel C. Murray
(74) *Attorney, Agent, or Firm* — Banner & Witcoff, Ltd.

(57) ABSTRACT

Methods and systems for optimized caching of data in a network of nodes are described herein. A server node of a plurality of server nodes may receive, from a device (e.g., a client device), a request for data. The request may be transmitted to the server node via a load balancing device. The server node may retrieve the data requested by the device. The server node may cache, at a cache location internal to the server node, the data requested by the device. The method may comprise transmitting, by the server node, a request to update a data mapping table to indicate a mapping of the server node and the data requested by the device.

18 Claims, 11 Drawing Sheets

(56) References Cited

U.S. PATENT DOCUMENTS

| | | | | |
|---|---|---|---|---|
| 6,754,699 B2* | 6/2004 | Swildens | G06F 9/505 | 370/229 |
| 6,823,377 B1* | 11/2004 | Wu | H04L 67/2842 | 709/223 |
| 6,944,719 B2* | 9/2005 | Rowlands | G06F 12/0824 | 711/141 |
| 6,968,329 B1* | 11/2005 | Chung | H04L 67/2847 | 706/46 |
| 7,047,315 B1* | 5/2006 | Srivastava | H04L 45/50 | 370/236 |
| 7,143,143 B1* | 11/2006 | Thompson | G06F 16/9574 | 709/217 |
| 7,346,676 B1* | 3/2008 | Swildens | H04L 67/1008 | 709/223 |
| 7,363,361 B2* | 4/2008 | Tewari | H04L 12/14 | 709/223 |
| 7,376,712 B1* | 5/2008 | Granatelli | G05B 23/0267 | 702/188 |
| 7,484,002 B2* | 1/2009 | Swildens | H04L 12/14 | 709/241 |
| 7,574,499 B1* | 8/2009 | Swildens | G06F 9/505 | 709/202 |
| 7,774,470 B1* | 8/2010 | Sanders | H04L 63/1483 | 709/219 |
| 7,779,097 B2* | 8/2010 | Lamkin | G11B 27/10 | 709/223 |
| 7,937,477 B1* | 5/2011 | Day | G06Q 20/401 | 709/227 |
| 7,941,741 B1* | 5/2011 | Skillman | G06F 16/9566 | 715/208 |
| 8,041,735 B1* | 10/2011 | Lacapra | G06F 16/13 | 707/783 |
| 8,074,026 B2* | 12/2011 | Kim | G06F 12/0817 | 711/118 |
| 8,296,123 B2* | 10/2012 | Thayer | G06F 17/2818 | 704/2 |
| 8,332,515 B2* | 12/2012 | Mansell | H04L 67/40 | 709/203 |
| 8,346,753 B2* | 1/2013 | Hayes | G06F 16/951 | 707/709 |
| 8,578,097 B2* | 11/2013 | Kim | G06F 12/0817 | 711/118 |
| 8,612,550 B2* | 12/2013 | Yoo | H04L 45/44 | 709/219 |
| 8,954,674 B2* | 2/2015 | Kim | G06F 12/0817 | 711/118 |
| 8,966,180 B2* | 2/2015 | Kim | G06F 12/0817 | 711/118 |
| 9,116,911 B2 | 8/2015 | Broussard | G06F 16/435 | |
| 9,280,471 B2 | 3/2016 | Gulati | G06F 12/084 | |
| 9,282,145 B2 | 3/2016 | Wei | H04L 67/2804 | |
| 9,323,672 B2 | 4/2016 | Kim | G06F 12/0817 | |
| 9,407,716 B1* | 8/2016 | Desai | H04L 61/10 | |
| 9,525,730 B2 | 12/2016 | Park | H04L 67/1027 | |
| 9,560,468 B2 | 1/2017 | Fitzgerald | H04W 4/00 | |
| 9,632,934 B2 | 4/2017 | Johnson | G06F 12/0815 | |
| 9,667,739 B2 | 5/2017 | Yoo | H04L 45/44 | |
| 9,756,071 B1 | 9/2017 | Golshan | G06F 16/9574 | |
| 9,870,349 B2 | 1/2018 | Wei | G06F 16/00 | |
| 10,169,094 B2 | 1/2019 | Iyer | G06F 9/505 | |
| 10,375,159 B2 | 8/2019 | McMullen | | |
| 10,404,791 B2 | 9/2019 | Puri | | |
| 10,455,043 B2* | 10/2019 | Wei | G06F 40/14 | |
| 2002/0026560 A1* | 2/2002 | Jordan | G06F 9/505 | 711/120 |
| 2002/0035673 A1* | 3/2002 | Roseborough | H04L 67/2819 | 711/129 |
| 2002/0048269 A1* | 4/2002 | Hong | H04L 29/06 | 370/389 |
| 2002/0052942 A1* | 5/2002 | Swildens | G06F 9/505 | 709/223 |
| 2002/0078174 A1* | 6/2002 | Sim | H04L 47/125 | 709/219 |
| 2002/0083118 A1* | 6/2002 | Sim | H04L 47/125 | 718/105 |
| 2002/0133570 A1* | 9/2002 | Michel | H04L 29/12009 | 709/219 |
| 2002/0152309 A1* | 10/2002 | Gupta | H04L 12/14 | 709/225 |
| 2003/0037108 A1* | 2/2003 | Peiffer | H04L 29/06 | 709/203 |
| 2003/0046394 A1* | 3/2003 | Goddard | H04L 29/06 | 709/226 |
| 2003/0061278 A1* | 3/2003 | Agarwalla | H04L 67/2804 | 709/203 |
| 2003/0065743 A1* | 4/2003 | Jenny | H04L 29/06 | 709/219 |
| 2003/0084045 A1* | 5/2003 | Anderson | H04L 67/06 | |
| 2003/0084128 A1* | 5/2003 | Anderson | H04L 67/06 | 709/220 |
| 2003/0191822 A1* | 10/2003 | Leighton | H04L 29/06 | 709/219 |
| 2004/0024880 A1* | 2/2004 | Elving | H04L 67/1008 | 709/227 |
| 2004/0034747 A1* | 2/2004 | Rowlands | G06F 12/0831 | 711/148 |
| 2004/0049579 A1* | 3/2004 | Ims | H04L 67/2823 | 709/225 |
| 2004/0049598 A1* | 3/2004 | Tucker | H04L 67/2819 | 709/246 |
| 2004/0133538 A1* | 7/2004 | Amiri | G06F 16/24539 | |
| 2005/0033858 A1* | 2/2005 | Swildens | H04L 29/12066 | 709/232 |
| 2006/0064478 A1* | 3/2006 | Sirkin | H04L 29/12066 | 709/223 |
| 2006/0167975 A1* | 7/2006 | Chan | H04L 67/2819 | 709/203 |
| 2006/0167979 A1* | 7/2006 | Fuchs | H04L 67/2828 | 709/203 |
| 2007/0174426 A1* | 7/2007 | Swildens | H04L 12/14 | 709/217 |
| 2007/0266206 A1* | 11/2007 | Kim | G06F 12/0817 | 711/118 |
| 2008/0034163 A1* | 2/2008 | Dong | G06F 12/0806 | 711/130 |
| 2008/0114739 A1* | 5/2008 | Hayes | G06F 16/951 | |
| 2008/0262828 A1* | 10/2008 | Och | G06F 17/2818 | 704/3 |
| 2008/0271130 A1* | 10/2008 | Ramamoorthy | G06F 16/1824 | 726/9 |
| 2009/0182843 A1* | 7/2009 | Hluchyj | H04L 67/2804 | 709/219 |
| 2010/0217948 A1* | 8/2010 | Mason | G06F 12/0866 | 711/171 |
| 2010/0325264 A1* | 12/2010 | Crowder | G06F 15/173 | 709/224 |
| 2011/0055386 A1* | 3/2011 | Middleton | H04L 67/125 | 709/224 |
| 2011/0060812 A1* | 3/2011 | Middleton | G06F 16/9574 | 709/219 |
| 2011/0153864 A1* | 6/2011 | Prasad | H04L 29/12066 | 709/242 |
| 2011/0153941 A1* | 6/2011 | Spatscheck | G06F 9/5083 | 711/119 |
| 2012/0042121 A1* | 2/2012 | Kim | G06F 12/0817 | 711/105 |
| 2012/0109987 A1* | 5/2012 | Broussard | G06F 16/435 | 707/754 |
| 2012/0110113 A1* | 5/2012 | Lee | H04L 67/2852 | 709/214 |
| 2012/0198032 A1* | 8/2012 | Fitzgerald | H04W 4/00 | 709/219 |
| 2012/0203825 A1* | 8/2012 | Choudhary | H04L 65/4076 | 709/203 |
| 2012/0203866 A1* | 8/2012 | Yoo | H04L 45/44 | 709/219 |

(56) References Cited

U.S. PATENT DOCUMENTS

| | | | |
|---|---|---|---|
| 2012/0278440 A1* | 11/2012 | Iyer | G06F 9/505 709/219 |
| 2013/0173408 A1* | 7/2013 | Lindblom | G06Q 30/0283 705/26.1 |
| 2013/0179633 A1* | 7/2013 | Kim | G06F 12/0817 711/105 |
| 2013/0238472 A1* | 9/2013 | Fan | G06Q 30/04 705/34 |
| 2013/0238473 A1* | 9/2013 | Fan | G06Q 30/04 705/34 |
| 2013/0251339 A1* | 9/2013 | Crowder | H04N 21/23439 386/241 |
| 2013/0304867 A1* | 11/2013 | Raman | H04L 67/1027 709/219 |
| 2014/0040542 A1* | 2/2014 | Kim | G06F 12/0817 711/105 |
| 2014/0164700 A1* | 6/2014 | Liang | G06F 12/0806 711/119 |
| 2014/0173624 A1* | 6/2014 | Kurabayashi | G06F 9/5083 718/105 |
| 2014/0281266 A1* | 9/2014 | Johnson | G06F 12/0815 711/141 |
| 2015/0074222 A1* | 3/2015 | Liang | H04L 67/2842 709/214 |
| 2015/0088968 A1* | 3/2015 | Wei | H04L 67/02 709/203 |
| 2015/0088969 A1* | 3/2015 | Wei | H04L 67/2804 709/203 |
| 2015/0088970 A1* | 3/2015 | Wei | G06F 16/00 709/203 |
| 2015/0088975 A1* | 3/2015 | Wei | G06F 9/54 709/203 |
| 2015/0095448 A1* | 4/2015 | Hwang | H04L 67/2842 709/216 |
| 2015/0143044 A1* | 5/2015 | Gulati | G06F 12/084 711/121 |
| 2015/0178200 A1* | 6/2015 | Kim | G06F 12/0817 711/118 |
| 2015/0248455 A1* | 9/2015 | Sevilla | G06F 16/22 707/736 |
| 2015/0347246 A1* | 12/2015 | Matsui | G06F 11/2028 714/4.12 |
| 2015/0381757 A1* | 12/2015 | Yoo | H04L 45/44 709/213 |
| 2016/0062888 A1* | 3/2016 | Wondra | G06F 12/0804 711/119 |
| 2016/0088072 A1* | 3/2016 | Likhtarov | H04L 67/1008 709/226 |
| 2016/0188549 A1* | 6/2016 | Wei | H04L 67/2823 715/744 |
| 2017/0163724 A1* | 6/2017 | Puri | H04L 43/0805 |
| 2017/0208148 A1* | 7/2017 | Bran | H04L 67/06 |
| 2018/0067909 A1* | 3/2018 | Wei | G06F 16/00 |
| 2018/0121401 A1* | 5/2018 | Wei | H04L 67/34 |
| 2019/0114207 A1* | 4/2019 | Iyer | G06F 9/505 |
| 2019/0173974 A1* | 6/2019 | Yoo | H04L 45/44 |
| 2019/0182554 A1* | 6/2019 | Schupak | H04L 65/601 |

OTHER PUBLICATIONS

"NodeBalancer Reference Guide;" Accessed Apr. 28, 2017; https://www.linode.com/docs/platform/nodebalancer/nodebalancer-reference-guide.

* cited by examiner

910

| Data ID or Device ID | Node ID |
|---|---|
| D1 | N1 |
| D2 | N2 |
| D3 | N1 |
| D4 | N3 |

| Data ID | Data Object Elements |
|---|---|
| D1 | {user="user1"; more data} |
| D3 | {user="jdoe"; more data} |

| Data ID | Data Object Elements |
|---|---|
| D2 | {user="user2"; more data} |

| Data ID | Data Object Elements |
|---|---|
| D4 | {user="user3"; more data} |

| Data ID or Device ID | Node ID |
|---|---|
| D1 | N3 |
| D2 | N2 |
| D3 | N1 |
| D4 | N3 |

| Data ID | Data Object Elements |
|---|---|
| D3 | {user="jdoe"; more data} |

| Data ID | Data Object Elements |
|---|---|
| D2 | {user="user2"; more data} |

| Data ID | Data Object Elements |
|---|---|
| D4 | {user="user3"; more data} |
| D1 | {user="user1"; more data} |

*FIG. 10D*

OPTIMIZING CACHING OF DATA IN A NETWORK OF NODES USING A DATA MAPPING TABLE BY STORING DATA REQUESTED AT A CACHE LOCATION INTERNAL TO A SERVER NODE AND UPDATING THE MAPPING TABLE AT A SHARED CACHE EXTERNAL TO THE SERVER NODE

FIELD

Aspects described herein generally relate to computer networking and data security. More specifically, aspects described herein relate to optimized caching of data in a network of nodes.

BACKGROUND

In multi-node networks, multiple versions of a server may be running (e.g., in a cloud or premise deployment), so that if one of the servers goes down, services may still be provided to client devices. However, existing multi-node networks may inefficiently share data between the nodes. For example, data used to service client devices may be stored in a shared server, and the node servicing a particular client device may need to retrieve the data from the shared server. In some instances, the shared server might not have the data, and the node servicing the client device may have to spend a significant amount of time finding the data.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, apparatuses, computer-readable media, memory, and methods for receiving, from a device (e.g., a client device) and by a server node of a plurality of server nodes, a request for data. The request may be transmitted to the server node via a load balancing device. The server node may retrieve the data requested by the device. The server node may cache, at a cache location internal to the server node, the data requested by the device. The method may comprise transmitting, by the server node, a request to update a data mapping table to indicate a mapping of the server node and the data requested by the device.

In some aspects, transmitting the request to update the data mapping table to indicate the mapping of the server node and the data requested by the device may comprise transmitting a request to update the data mapping table to store a data identifier associated with the data requested by the device, a server node identifier associated with the server node, and a mapping of the data identifier to the server node identifier. The data mapping table may be stored at a shared cache that is accessible to each server node of the plurality of server nodes.

In some aspects, the server node may comprise a first server node. The method may further comprise receiving, from the device and by a second server node of the plurality of server nodes, a request for the data. The request for the data may be transmitted to the second server node via the load balancing device. The second server node may access, based on the data mapping table, the indication of the mapping of the first server node and the data requested by the device. The second server node may transmit, to the first server node, a request for the data. In response to transmitting, by the second server node and to the first server node, the request for the data, the second server node may receive, from the first server node, the data. The second server node may cache, at a cache location internal to the second server node, the data requested by the device.

In some aspects, the second server node may transmit, to the device, the data requested by the device. Additionally or alternatively, the second server node may transmit a request to update the data mapping table to indicate a mapping of the second server node and the data requested by the device. The second server node may transmit, to the first server node, a request for the first server node to delete, from the cache location internal to the first server node, the data requested by the device.

In some aspects, the load balancing device may be configured to transmit the request to the server node based on a previous session between the device and the server node. The load balancing device may be configured to transmit the request to the server node based on a load balancing stickiness technique.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 9A-D illustrate examples of mapping data to optimize caching of data in accordance with one or more illustrative aspects described herein.

FIGS. 10A-D illustrate examples of mapping data to optimize caching of data in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards methods and systems for a server node of a plurality of server nodes to receive, from a device (e.g., a client device), a request for data. The request may be transmitted to the server node via a load balancing device. The server node may retrieve the data requested by the device. The server node may cache, at a cache location internal to the server node, the data requested by the device. The method may comprise transmitting, by the server node, a request to update a data mapping table to indicate a mapping of the server node and the data requested by the device.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
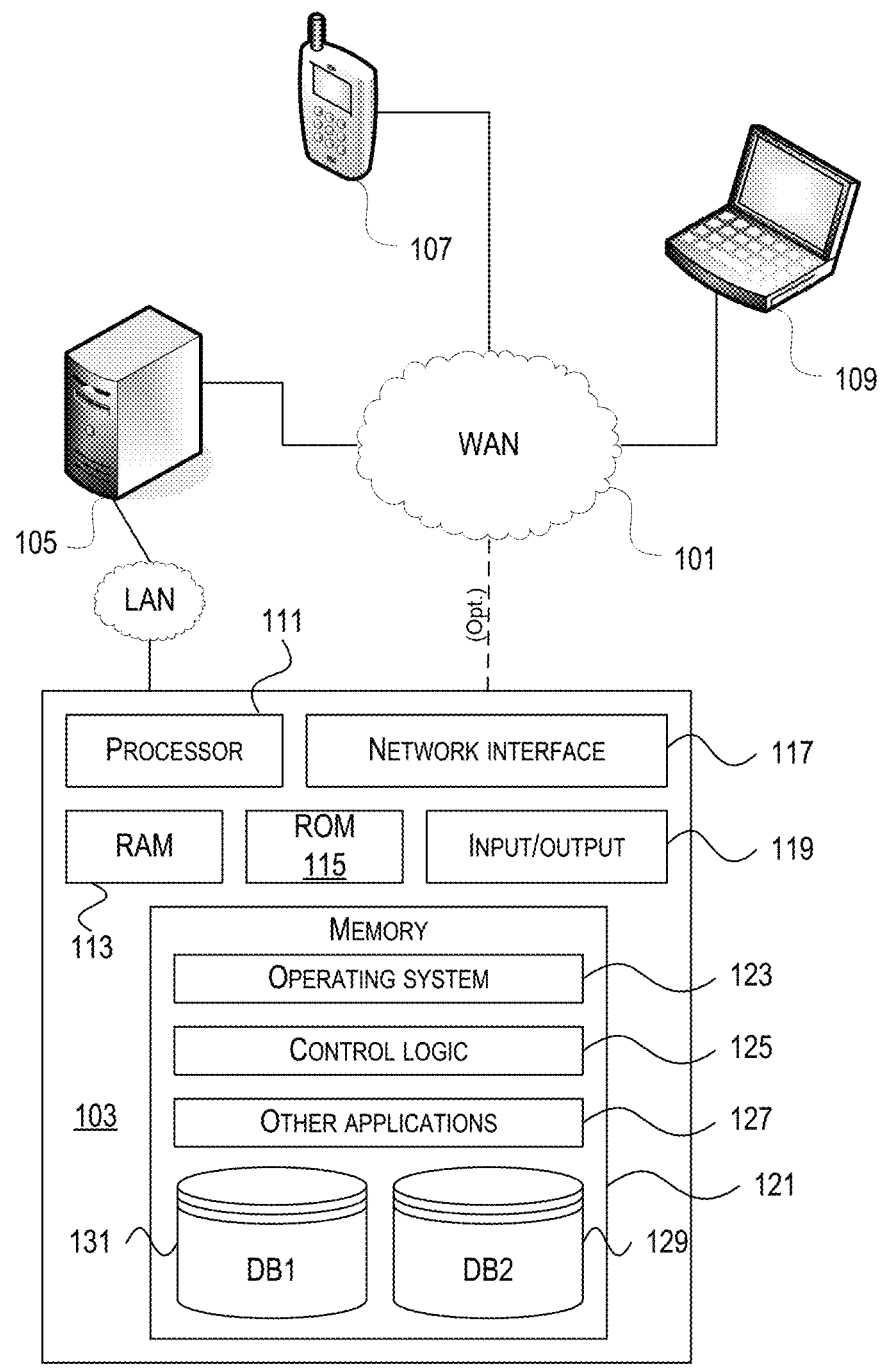
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
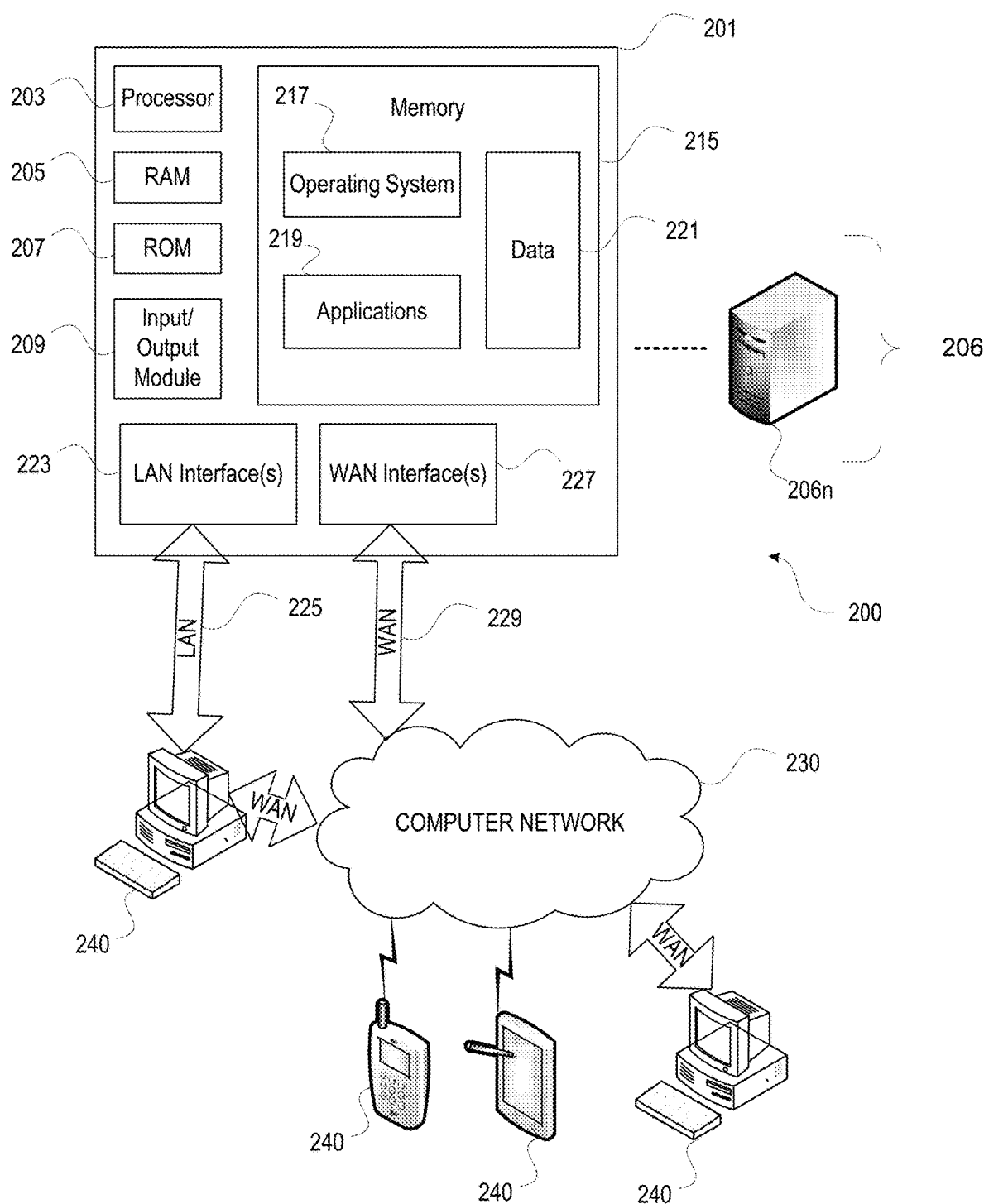
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
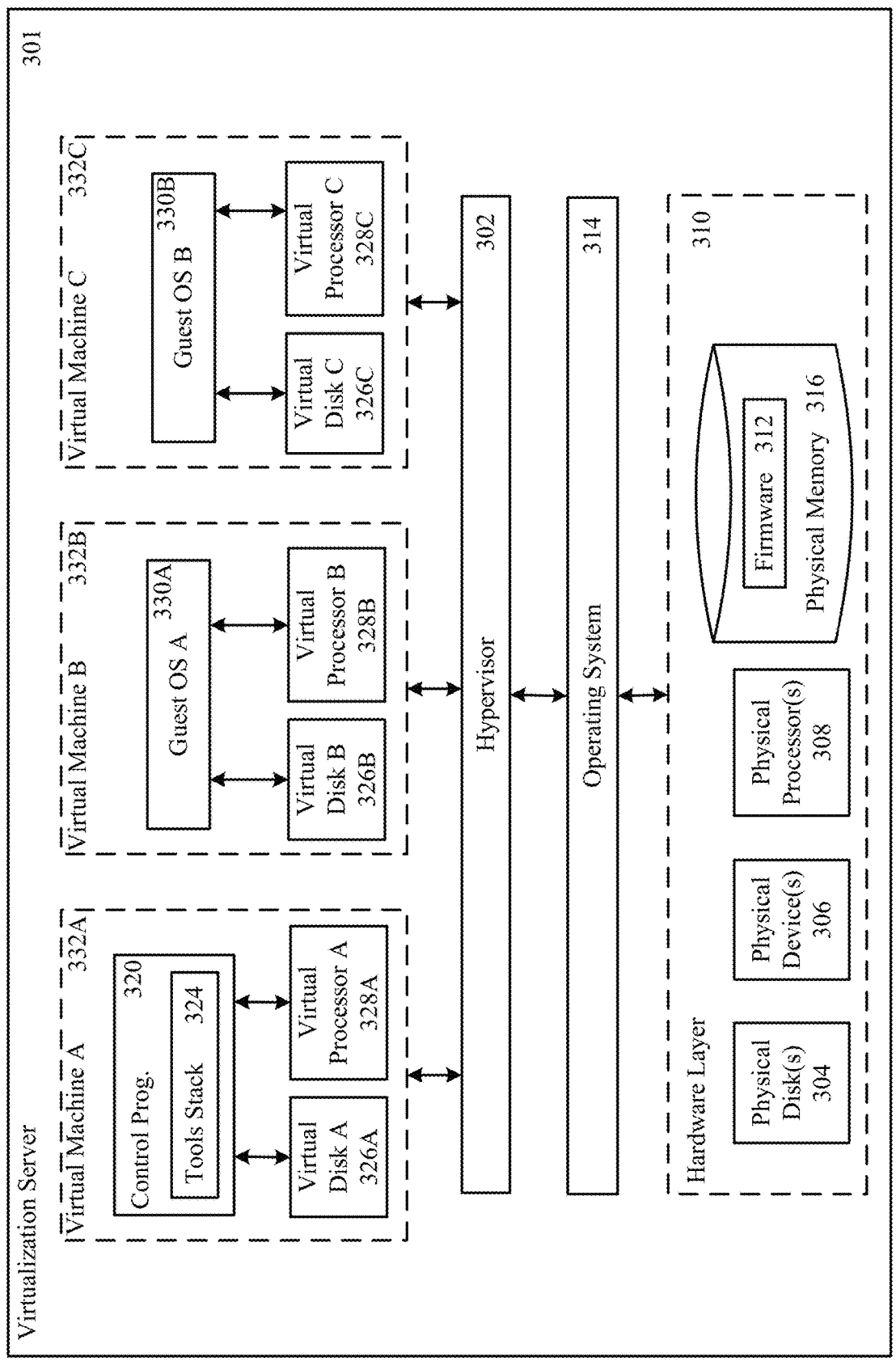
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
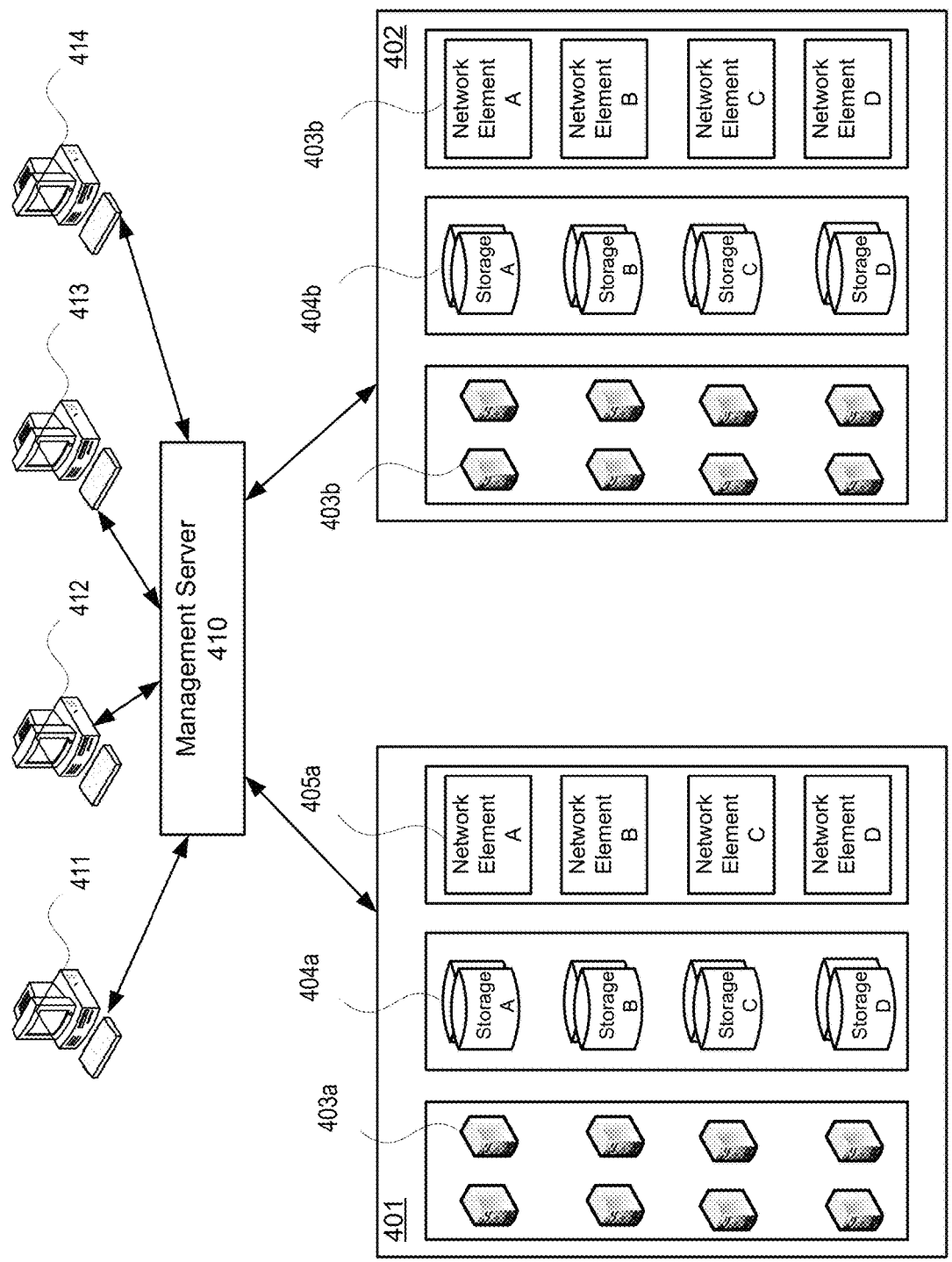
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
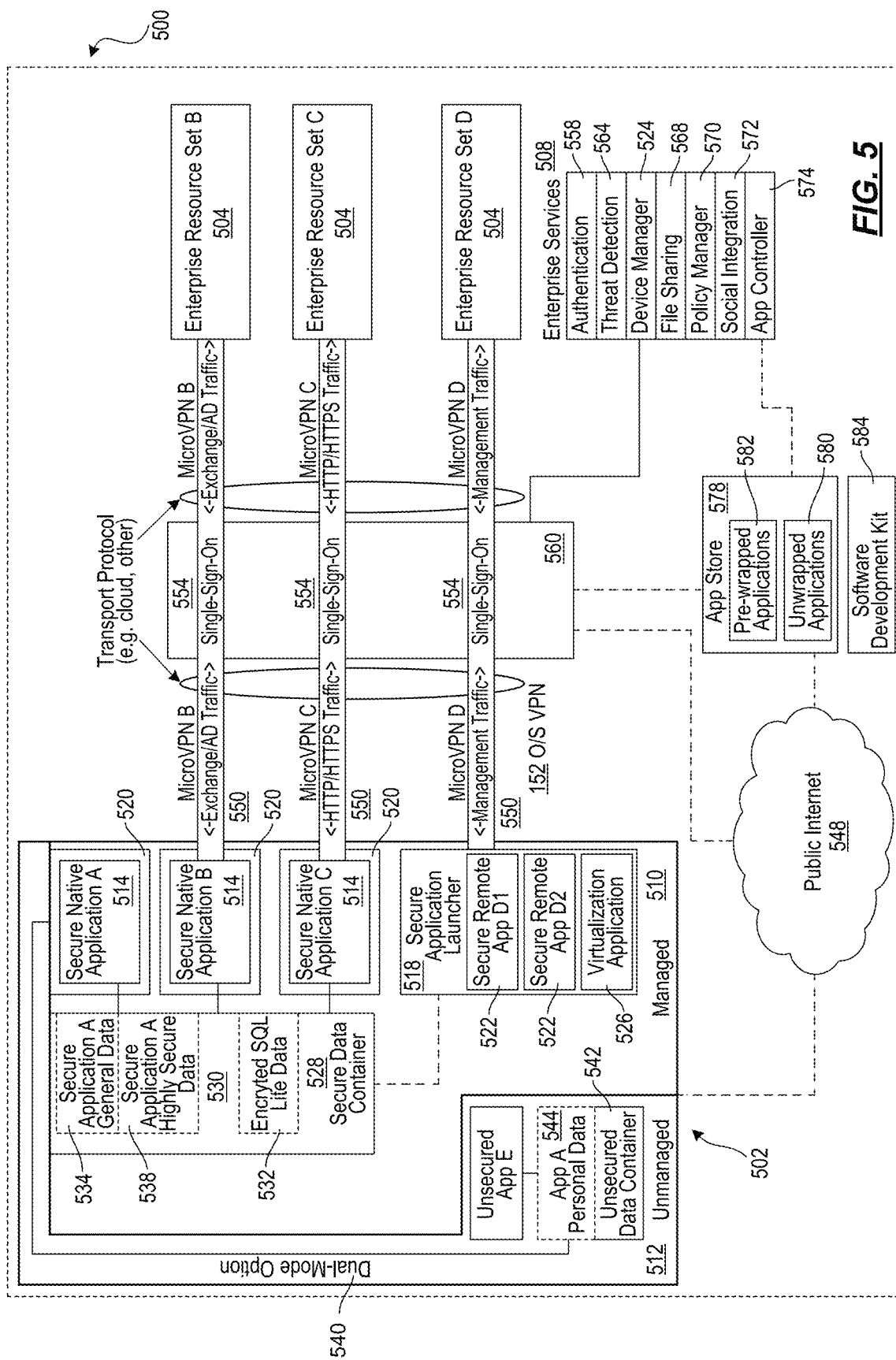
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
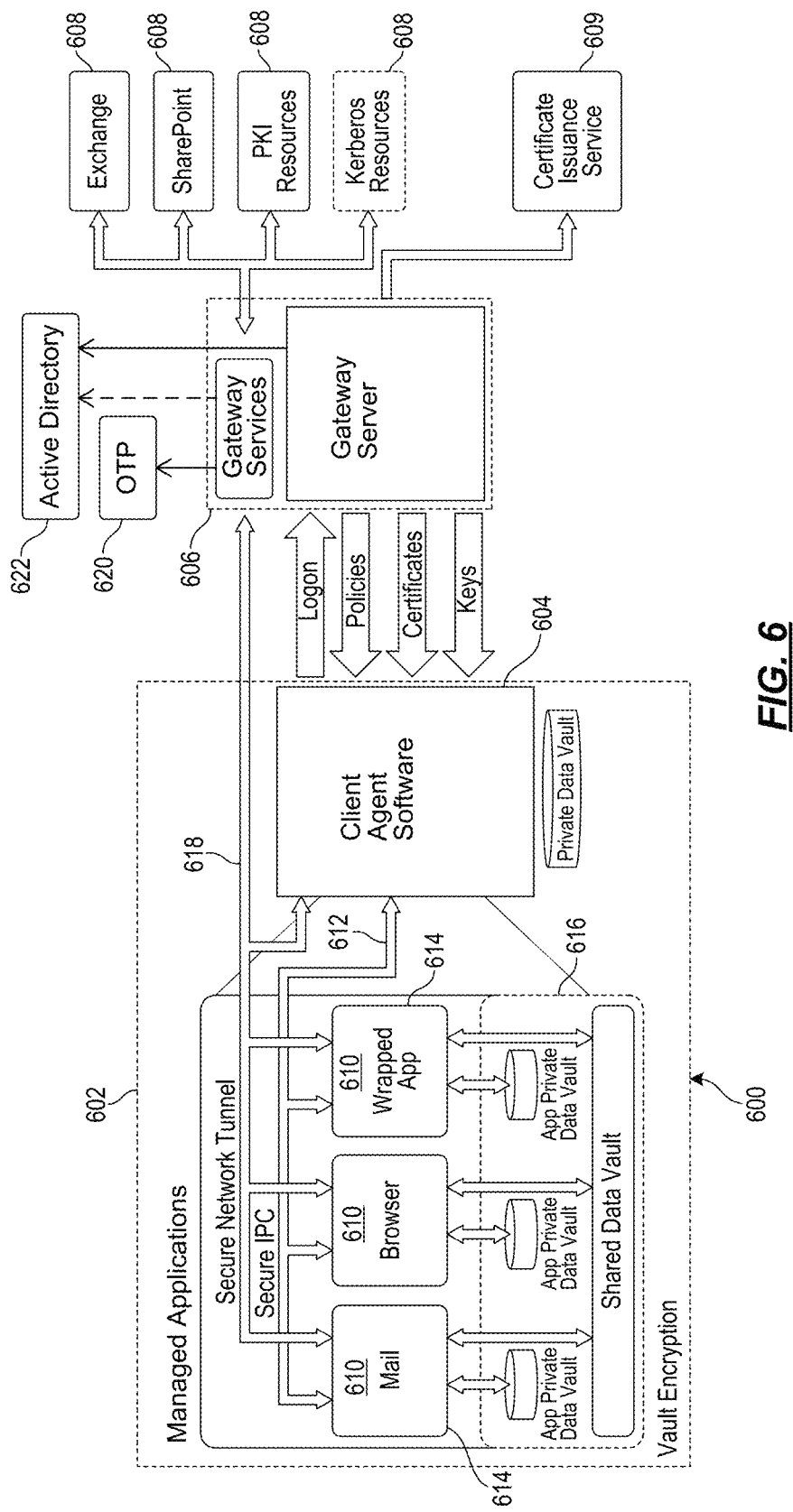
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally, the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Figure 7:
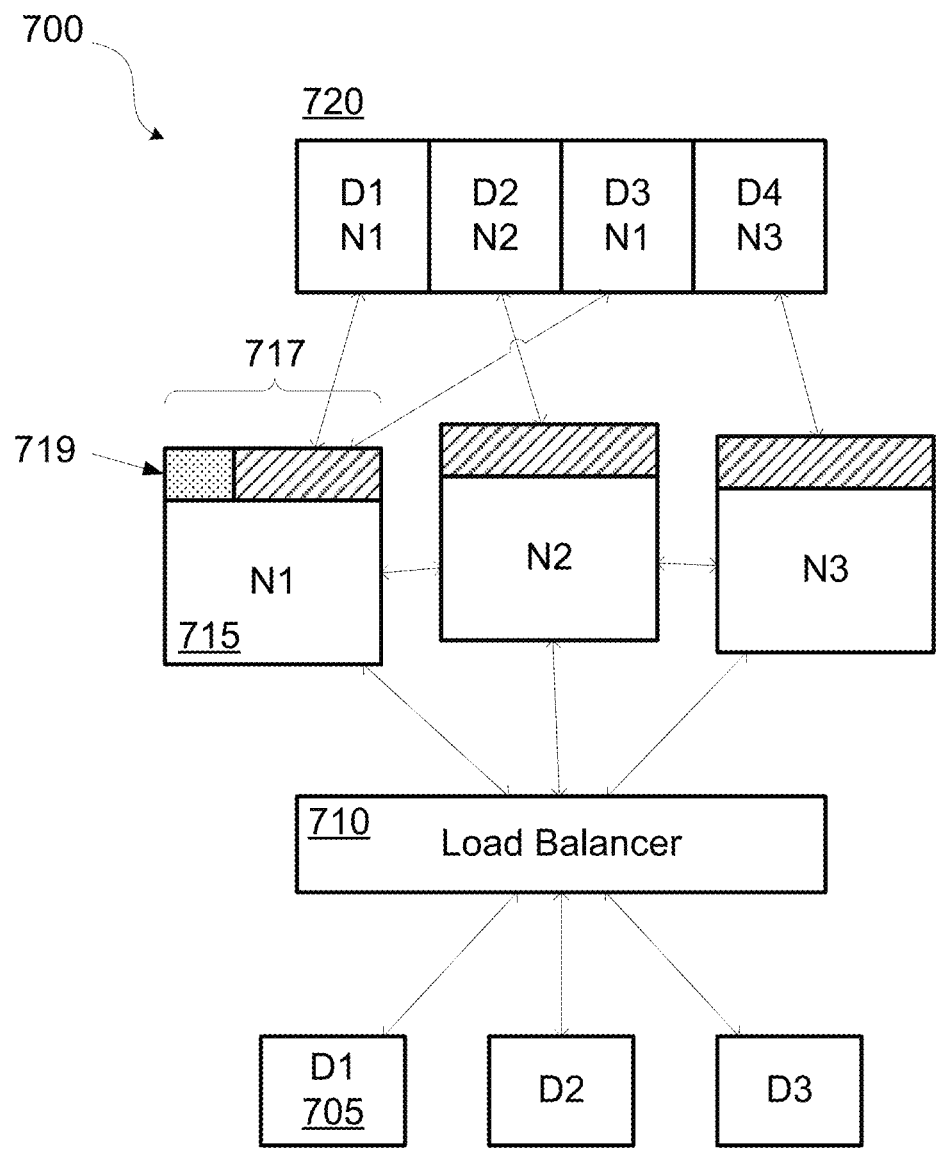
FIG. 7 illustrates an example system for optimized caching of data in accordance with one or more illustrative aspects described herein.

FIG. 7 illustrates an example system 700 for optimized caching of data in accordance with one or more illustrative aspects described herein. The system may comprise a plurality of devices, such as a device D1 705, a device D2, a device D3, etc. The devices may request data and/or resources made available by one or more server nodes (e.g., server nodes N1, N2, N3, etc.). In some aspects, a device may comprise, for example, the client computer 107 or 109, client device 240, client computer 411-414, mobile device 502, or mobile device 602, as previously described.

The system 700 may comprise one or more load balancers 710. In some aspects, the load balancer 710 may be used as a proxy to distribute network or data traffic across a plurality of server nodes (e.g., server nodes N1, N2, N3). For example, a device, such as device D1, may request data from one or more of the server nodes. The request may be transmitted to the load balancer 710, and the load balancer 710 may determine which server node to use to handle the request. Data transmitted between the devices and the load balancer(s) may be secured via, for example, Hyper Text Transfer Protocol Secure (HTTPS). In some aspects, the load balancer 710 may comprise, for example, the access gateway 560, the gateway server 606, or another proxy device located between the devices and server nodes.

The system 700 may comprise a plurality of server nodes, such as server node N1 715, server node N2, server node N3, and the like. Each of the plurality of server nodes may be connected, via one or more communication lines, to the load balancer 710. Moreover, each of the plurality of server nodes may be connected, via one or more communication lines, to other server nodes in the network. As will be described in further detail below, a server node may communicate directly with another server node, such as to request cached data, transmit cached data, and/or to request another server node to delete data stored in its cache.

The system 700 may comprise a shared cache device 720. In some aspects, the shared cache 720 may store metadata, such as a mapping table (e.g., a shared table), that maps data and/or devices (e.g., device D1, D2, D3) to server nodes (e.g., server node N1, N2, N3). The mapping table may identify data using a respective data identifier (ID), and may identify nodes using a respective node ID. In some aspects, the node ID may comprise a unique number or string by which each node in the cluster identifies itself. The mapping table may map each data ID to a particular node ID. In some aspects, the shared cache 720 might not store actual data objects. Instead, actual data objects may instead be stored at respective server nodes, as will be described in further detail below. By caching data objects at respective server nodes and/or storing a mapping table at the shared cache device, the amount of data stored at the shared cache may be reduced and network input/output and latency may be reduced, providing a higher performance than existing solutions. Moreover, by caching data objects at respective server nodes and/or storing a mapping table at the shared cache device, the performance of the shared cache is not negatively impacted by the number of server nodes in the cluster that access the data.

FIG. 9A illustrates an example of a mapping table 910 stored at the shared cache device 720 in accordance with one or more illustrative aspects described herein. A plurality of devices D1, D2, D3 and D4 may connect to a load balancer 710, such as via HTTPS or another secure protocol. Each of the devices may be serviced by a node N1, N2, or N3. The mapping table 910 may indicate that device D1 is serviced by (and may have data cached at) node N1, device D2 is serviced by (and may have data cached at) node N2, device D3 is serviced by (and may have data cached at) node N1, and device D4 is serviced by (and may have data cached at) node N3.

In some aspects, the load balancer 710 may implement session persistence (e.g., node stickiness), such that future requests by a device are directed to a node that previously serviced that device. For example, assume that node N1 previously serviced device D1. If device D1 initiates a subsequent request, the load balancer 710 may direct the request to node N1. Due to stickiness, approximately 90% of the requests from device D1, for example, may be directed to the node N1. Load balancer stickiness may be based on source IP or SSL session IDs. However, node stickiness may fail in some circumstances. For example, source IP and SSL session IDs may change during a multi-packet network transaction between a mobile device and a gateway server deployment. Aspects described herein provide an efficient caching mechanism that may be used in a cloud service or an on premise deployment when node stickiness is not guaranteed. For example, the exemplary system described herein may allow the network to benefit from node stickiness, but does not require node stickiness to improve upon prior caching systems.

In some aspects, each server node may have cache storage for temporary storage of data. For example and with reference to FIG. 7, server node N1 715 may include cache storage 717. Cache storage 717 may be used to temporarily store data, such as device D1's data 719, for a particular session. Other nodes may similarly have their own cache storage, and data objects may be cached at each node using the node's respective cache storage. The data objects may comprise, for example, actual data to be cached (as opposed to the metadata stored in the shared cache 720). Each data object may comprise a plurality of elements (e.g., data object elements), and may comprise read-write objects, write dominant objects, or read dominant objects. Data objects may be local and may be stored locally on a particular node (e.g., not in the shared cache). In some aspects, data objects need not be stored in a distributed cache or a distributed data store. Data objects may be identified using a data ID. That is, the data ID may be used to uniquely identify a particular data object. In some aspects, the data ID may be unique to a particular client device, such as the device identifier of a mobile device. Locally storing data objects at each node and a mapping table at a share cache may allow for efficient caching of read-write data objects and write dominant data objects (in addition to read dominant data objects). Existing caches might only be optimized for read dominant data objects.

FIG. 9B illustrates an example 915 of data object elements cached at a server node, such as server node N1, in accordance with one or more illustrative aspects described herein. The first entry may be created when device D1 is directed to node N1, and N1 reaches out to the shared cache 720 to determine the data it is to push out to device D1. In some aspects, the device D1 may reach out to node N1 most of the time (e.g., due to node stickiness), and node N1 may be able to service the request from device D1 locally from the cache of node N1. The data object elements associated with the data ID D1 (and cached at node N1) may comprise, for example, user identification information (e.g., "user1") and other data. The data object elements associated with the data ID D3 (and also cached at node N1) may comprise, for example, user identification information (e.g., "jdoe") and other data. The mapping table 910 stored in the shared cache 720 may indicate the mapping of data ID D1 and data ID D3 to node N1.

FIG. 9C illustrates an example 920 of data object elements cached at a server node, such as server node N2, in accordance with one or more illustrative aspects described herein. The data object elements associated with the data ID D2 (and cached at node N2) may comprise, for example, user identification information (e.g., "user2") and other data. The mapping table 910 may indicate the mapping of data ID D2 to node N2.

FIG. 9D illustrates an example 925 of data object elements cached at a server node, such as server node N3, in accordance with one or more illustrative aspects described herein. The data object elements associated with the data ID D4 (and cached at node N3) may comprise, for example, user identification information (e.g., "user3") and other data. The mapping table 910 may indicate the mapping of data ID D4 to node N3. The data ID and data object elements illustrated in FIGS. 9B-D are exemplary, other types of data may be cached at the nodes. For example, data object elements of different types and sizes may be cached at the nodes.

In some aspects, a device (e.g., device D1) may be redirected to a different node (e.g., node N3 instead of node N1 illustrated in FIG. 7) during a subsequent request. For example, node stickiness may fail at the load balancer, the node stickiness session may have expired, or a network event may have caused the load balancer to direct the device D1 to the node N3. A brief example of a system and method for efficiently caching data will now be provided, with additional examples to follow with reference to FIGS. 8A and 8B below. Node N3 may determine that data for device D1 is not available in the local cache of node N3 and attempt to find the node that has the data for device D1. For example, node N3 may reach out to the shared cache 720 storing a mapping table (e.g., mapping table 910), and may determine that the data object for device D1 is located on node N1. Node N3 may reach out to node N1, and request transfer of the data object from node N1 to node N3. Node N1 may send device D1's data object to node N3. Once node N3 receives device D1's data object, node N3 may create an entry for (e.g., copy) the data object to node N3's data object cache. Node N3 may update the entry in the shared cache to indicate that device D1's data is now located on node N3. Node N3 may also request that node N1 remove device D1's data from its cache.

In some aspects, node N1 might not be able to provide device D1's data to node N3. For example, node N1 may be offline or otherwise not usable to service client requests, and N3 might not be able to acquire device D1's data from node N1. Node N3 may still update the entry in the shared cache to indicate that device D1's data is now located on node N3. Node N3 may also request the data from device D1 or the previous data that device D1 was provided. In some aspects, node N3 may also reach out to a database to recreate the data. In case of high-availability, lost data may be regenerated.

FIG. 10A illustrates an example of a mapping table 1010 stored at the shared cache device 720 in accordance with one or more illustrative aspects described herein. The mapping table 1010 may be the new state of the table after node N3 has requested to update the shared cache to indicate that device D1's data is now located on node N3. As described herein, data may be transferred on demand and/or if there is a change to the server node servicing a device's request. By transferring the data between server nodes, network I/O and latency may be reduced and network performance may be increased relative to existing caching solutions. Moreover, the performance of the shared cache is not negatively impacted by the number of server nodes in the cluster that access the data, such as read, read-write, and write dominant data objects.

FIG. 10B illustrates an example 1015 of data object elements cached at a server node, such as server node N1, in accordance with one or more illustrative aspects described herein. The data object elements associated with the data ID D3 (and also cached at node N1) may comprise, for example, user identification information (e.g., "jdoe") and other data. The mapping table 1010 stored in the shared cache 720 may indicate the mapping of data ID D3 to node N1.

FIG. 10C illustrates an example 1020 of data object elements cached at a server node, such as server node N2, in accordance with one or more illustrative aspects described herein. The data object elements associated with the data ID D2 (and cached at node N2) may comprise, for example, user identification information (e.g., "user2") and other data. The mapping table 1010 may indicate the mapping of data ID D2 to node N2.

FIG. 10D illustrates an example 1025 of data object elements cached at a server node, such as server node N3, in accordance with one or more illustrative aspects described herein. The data object elements associated with the data ID D4 (and cached at node N3) may comprise, for example, user identification information (e.g., "user3") and other data. The data object elements associated with the data ID D1 (and cached at node N3) may comprise, for example, user identification information (e.g., "user1") and other data. The mapping table 1010 stored in the shared cache 720 may indicate the mapping of data ID D1 and data ID D4 to node N3.

Figure 8A:
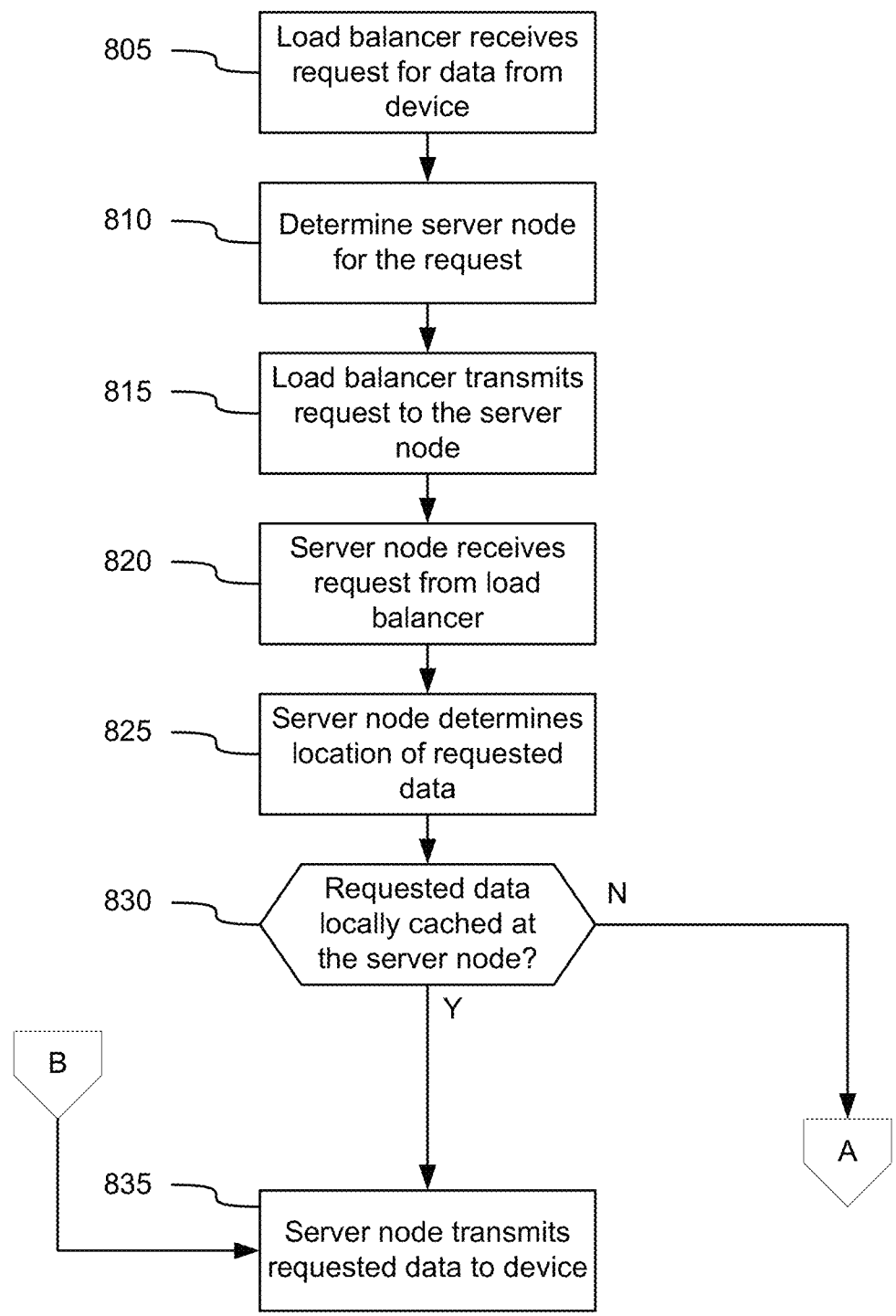
FIGS. 8A-B illustrate an example method of optimized caching of data in accordance with one or more illustrative aspects described herein.
Figure 8B:
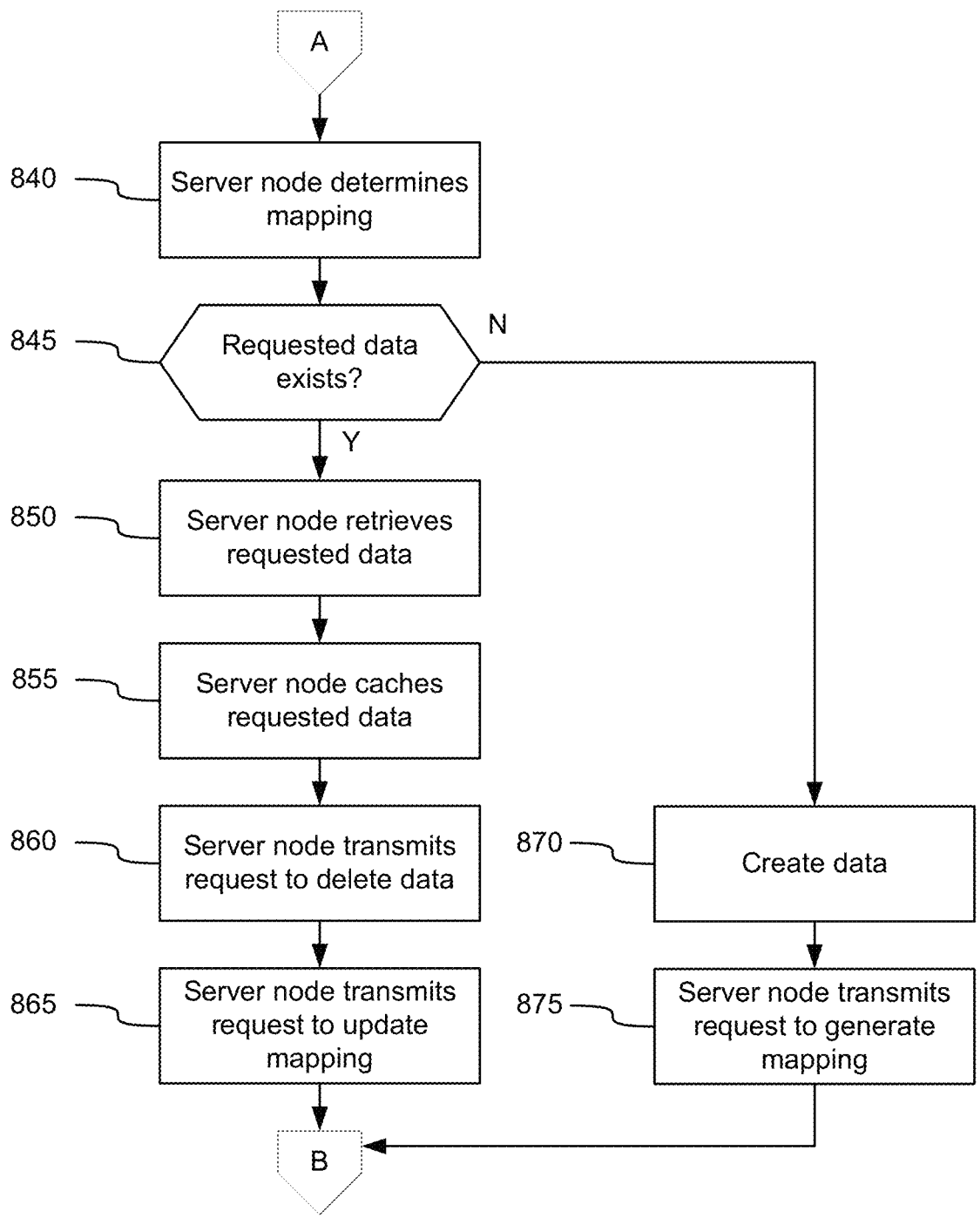

FIGS. 8A-B illustrate an example method of optimized caching of data in accordance with one or more illustrative aspects described herein. In step 805, the load balancing device 710 may receive a request for data from a device, such as device D1 705. The request may comprise, for example, a request to access network resources, which may be provided by a server node (e.g., server node N1) and/or a plurality of server nodes (e.g., server nodes N1, N2, and/or N3). As previously described, the devices may communicate with the load balancer using a secured communication protocol, such as HTTPs.

In step 810, a server node for the request may be determined. For example, the load balancer 710 may determine the server node for the request and/or may determine the server node based on the identity of the device requesting the data (e.g., device D1). As previously described, the load balancer 710 may determine the server node (e.g., node N1) based on a previous session between the server node N1 and the device D1 (e.g., based on a load balancing stickiness technique).

In step 815, the load balancer 710 may transmit the request to the server node (e.g., node N1) selected for the request. For example, the load balancer 710 may forward device D1's request to server node N1, and device D1's request may be transmitted to the server node N1 via the load balancer 710. In step 820, the server node (e.g., node N1) may receive the request from the load balancer 710.

Steps 805, 810, 815, and/or 820 may be performed for other client devices, such as device D2 or device D3. For example, in step 805, the load balancer 710 may receive a request for data from device D2. In step 810, the load balancer 710 may determine the server node to direct the request, such as server node N2, and the load balancer 710 may transmit the request to server node N2 in step 815. The server node N2 may receive the request from the load balancer 710 in step 820. Steps 805, 810, 815, and/or 820 may also be performed for client devices during subsequent or future requests. For example, in step 805, the load balancer 710 may receive a subsequent request for data from device D1. In step 810, the load balancer 710 may determine the server node to direct the request, such as server node N1. The load balancer 710 may determine to use server node N1 based on a previous session between device D1 and node N1. In step 815, the load balancer 710 may transmit the request from device D1 to server node N1. The server node N1 may receive the request from the load balancer 710 in step 820. As previously described, node stickiness may fail, the previous session may have expired, or another network event may have occurred. In these examples, the load balancer 710 may direct the request to a different node, such as node N3.

In step 825, the server node may determine the location of the data requested by the device. For example, the server node may determine whether the data is cached within a local cache of the server node. The server node may additionally or alternatively access metadata, such as a data mapping table (e.g., the data mapping table stored at the shared cache 720), to determine where the requesting device's data is cached. The data mapping table may indicate a mapping of the data requested by the device to a server node, as previously described. The actual data objects, on the other hand, may be stored at a cache local to a server node. By storing the mapping table at the shared cache 720 and data objects at respective nodes, the distribution of shared data may be minimized, resulting in improvements to network speed and efficiency. For example, the bandwidth used to transmit data between nodes and/or the shared cache may be reduced.

In step 830, the server node may determine whether the requested data is locally cached at the server node. If the requested data is locally cached at the server node (step 830: Y), the server node may proceed to step 835, as will be described in further detail below. If the requested data is not locally cached at the server node (step 830: N), the server node may proceed to step 840.

With reference to FIG. 8B, in step 840, the server node may determine a mapping for the data in order to determine the location of the data. In some aspects, the server node (e.g., server node N3) may access the shared table stored at the shared cache 720. The shared table may indicate that the data is cached at a different server node, such as server node N1. Alternatively, the shared table might not indicate a mapping for the requested data and/or requesting device.

In step 845, the server node may determine whether the requested data exists. The server node may determine whether the requested data is stored at any of the other server nodes in the cluster of server nodes. For example, the server node may determine whether the requested data is present or absent from the shared table stored at the shared cache 720. If the requested data does not exist (step 845: N), the server node may proceed to step 870, as will be described in further detail below. If the requested data exists (step 845: Y), the server node may proceed to step 850.

In step 850, the server node may retrieve the requested data. For example, the server node (e.g., server node N3) may transmit a request for the data to the server node having the data (e.g., server node N1). In response to the server node N3 transmitting the request for the data to server node N1, the server node N1 may transmit the data to the server node N3 and the server node N3 may receive, from the server node N1, the data.

In step 855, the server node (e.g., server node N3) may cache the requested data. For example, the server node N3 may copy the data received from server node N1 and cache the data at a cache storage location internal (e.g., local) to the server node N3.

In step 860, the server node may transmit a request to delete the data from the other storage location. For example, the server node N3 may transmit, to the server node N1, a request for the server node N1 to delete, from the cache location internal to the server node N1, the data that was requested by the client device. Accordingly, the server nodes in the cluster of server nodes may implement on demand cache invalidation by, for example, a first server node requesting a second server node to remove cached data from the second server node's cache storage after the data is cached at the first server node. In some aspects, there might only be one copy of the data among the cluster of server nodes, resulting in more efficient and optimized caching of data. For example, each time a server node writes data to its local cache, other copies (e.g., all other copies) may be invalidated.

In step 865, the server node may transmit a request to update the mapping for the requested data. For example, the server node N3 may transmit a request to update the data mapping table stored at the shared cache device 720 to indicate a mapping of the data requested by the device and the server node N3. The server node N3 may request to update the data mapping table to store a data identifier associated with the data requested by the device (e.g., data identifier D1), a server node identifier associated with the server node (e.g., server node N3), and a mapping of the data identifier to the server node identifier. An exemplary updated mapping table 1010 that associates D1 with N3 is illustrated in FIG. 10A. As previously described, the data mapping table may be stored at the shared cache 720, which may be accessible to each server node of the plurality of server nodes in the cluster.

With reference back to step 845, the requested data might not exist (e.g., step 845: N). For example, the mapping table might not include an indication of the data identifier D1. In these circumstances, the server node may proceed to step 870, and the server node may create (or request creation of) the data.

In step 875, the server node may transmit a request to generate a mapping for the created data. For example, the server node N3 may request to create an entry in the shared mapping table indicating that the created data is cached at the server node N3.

Returning to FIG. 8A, the server node having the cached data may transmit the data to the device requesting the data, such as device D1. For example, if node N1 has the requested data, node N1 may transmit, to the device D1, the data requested by the device D1. If node N3 has the requested data, node N3 may transmit, to the device D1, the data requested by the device D1. Accordingly, the appropriate node in the cluster of nodes may service the request from the client device and may efficiently perform the service by locally caching the data used to perform the service.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
   a shared cache configured to store a data mapping table that is accessible to each server node of a plurality of server nodes; and
   a load balancing device comprising:
      a processor; and
      memory storing computer-executable instructions that, when executed by the processor, cause the load balancing device to:
         receive, from a client device, a request for data; and
         transmit, to a server node of the plurality of server nodes, the request for the data;
   wherein the server node, of the plurality of server nodes, comprises:
      a processor; and
      memory storing computer-executable instructions that, when executed by the processor of the server node, cause the server node to:
         receive, from the load balancing device, the request for the data;
         retrieve the data requested by the client device;
         cache, at a cache location internal to the server node, the data requested by the client device; and
         transmit, to the shared cache that is external to the server node, a request to update the data mapping table to indicate a mapping of the server node and the data requested by the client device.

2. The system of claim 1, wherein the transmitting the request to update the data mapping table to indicate the mapping of the server node and the data requested by the client device comprises transmitting a request to update the data mapping table to store a data identifier associated with the data requested by the client device, a server node identifier associated with the server node, and a mapping of the data identifier to the server node identifier.

3. The system of claim 1, wherein the server node comprises a first server node, the system further comprising:
   a second server node comprising:
      a processor; and
      memory storing computer-executable instructions that, when executed by the processor of the second server node, cause the second server node to:
         receive, from the client device, a second request for the data, wherein the second request for the data is transmitted to the second server node via the load balancing device;
         access the data mapping table indicating the mapping of the first server node and the data requested by the client device;
         transmit, to the first server node, the second request for the data;
         in response to transmitting, to the first server node, the second request for the data, receive, from the first server node, the data; and
         cache, at a cache location internal to the second server node, the data requested by the client device.

4. The system of claim 3, wherein the memory of the second server node stores computer-executable instructions that, when executed by the processor of the second server node, cause the second server node to:
transmit, to the client device, the data requested by the client device.

5. The system of claim 3, wherein the memory of the second server node stores computer-executable instructions that, when executed by the processor of the second server node, cause the second server node to:
transmit, to the shared cache that is external to the second server node, a request to update the data mapping table to indicate a mapping of the second server node and the data requested by the client device.

6. The system of claim 3, wherein the memory of the second server node stores computer-executable instructions that, when executed by the processor of the second server node, cause the second server node to:
transmit, to the first server node, a request for the first server node to delete, from the cache location internal to the first server node, the data requested by the client device.

7. The system of claim 1, wherein the memory of the server node stores computer-executable instructions that, when executed by the processor of the server node, cause the server node to:
transmit, to the client device, the data requested by the client device.

8. The system of claim 1, wherein the load balancing device is configured to transmit the request to the server node based on a previous session between the client device and the server node.

9. The system of claim 1, wherein the load balancing device is configured to transmit the request to the server node based on a load balancing stickiness technique.

10. A method comprising:
receiving, from a client device and by a server node of a plurality of server nodes, a request for data, wherein the request is transmitted to the server node via a load balancing device;
retrieving, by the server node, the data requested by the client device;
caching, by the server node and at a cache location internal to the server node, the data requested by the client device; and
transmitting, by the server node and to a shared cache that is external to the server node, a request to update a data mapping table, which is stored in the shared cache and is accessible to each server node of the plurality of server nodes, to indicate a mapping of the server node and the data requested by the client device.

11. The method of claim 10, wherein the transmitting the request to update the data mapping table to indicate the mapping of the server node and the data requested by the client device comprises transmitting a request to update the data mapping table to store a data identifier associated with the data requested by the client device, a server node identifier associated with the server node, and a mapping of the data identifier to the server node identifier.

12. The method of claim 10, wherein the server node comprises a first server node, the method further comprising:
receiving, from the client device and by a second server node of the plurality of server nodes, a second request for the data, wherein the second request for the data is transmitted to the second server node via the load balancing device;
accessing, by the second server node, the data mapping table, indicating the mapping of the first server node and the data requested by the client device;
transmitting, by the second server node and to the first server node, the second request for the data;
in response to transmitting, by the second server node and to the first server node, the second request for the data, receiving, by the second server node and from the first server node, the data; and
caching, by the second server node and at a cache location internal to the second server node, the data requested by the client device.

13. The method of claim 12, further comprising:
transmitting, by the second server node and to the client device, the data requested by the client device.

14. The method of claim 12, further comprising:
transmitting, by the second server node, a request to update the data mapping table to indicate a mapping of the second server node and the data requested by the client device.

15. The method of claim 12, further comprising:
transmitting, by the second server node and to the first server node, a request for the first server node to delete, from the cache location internal to the first server node, the data requested by the client device.

16. The method of claim 10, wherein the load balancing device is configured to transmit the request to the server node based on a previous session between the client device and the server node.

17. The method of claim 10, wherein the load balancing device is configured to transmit the request to the server node based on a load balancing stickiness technique.

18. An apparatus comprising:
a processor; and
memory storing computer-executable instructions that, when executed by the processor, cause the apparatus to:
receive, from a client device, a request for data, wherein the request is transmitted to the apparatus via a load balancing device;
retrieve the data requested by the client device;
cache, at a cache location internal to the apparatus, the data requested by the client device; and
transmit, to a shared cache that is external to the apparatus, a request to update a data mapping table, which is stored in the shared cache and is accessible to a plurality of server nodes, to indicate a mapping of the apparatus and the data requested by the client device.

* * * * *